(12) United States Patent
Arima et al.

(10) Patent No.: US 6,382,842 B1
(45) Date of Patent: May 7, 2002

(54) PLUG-IN OPTICAL CONNECTOR WITH WRONG PLUGGING PREVENTION KEY

(75) Inventors: Shuji Arima; Takashi Nishiyama, both of Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/506,030

(22) Filed: Feb. 17, 2000

(30) Foreign Application Priority Data

Feb. 19, 1999 (JP) .......................................... 11-041812

(51) Int. Cl.[7] .................................................. G02B 6/36
(52) U.S. Cl. .............................. 385/77; 385/59; 385/60; 385/56; 385/78
(58) Field of Search ........................ 385/55–60, 70–72, 385/75–78

(56) References Cited

U.S. PATENT DOCUMENTS 5,528,711 A  *  6/1996  Iwano et al. .................... 385/56
5,729,644 A  *  3/1998  Shiflett et al. ................. 385/59

* cited by examiner

*Primary Examiner*—Hemang Sanghavi
(74) *Attorney, Agent, or Firm*—Kanesaka & Takeuchi

(57) ABSTRACT

A plug-in optical connector consists of a pair of optical connectors (1, 2) fixed on a pair of boards (3, 4), respectively. At least one (1) of the optical connectors (1, 2) is provided with a wrong plugging prevention key (5*a*) while the other optical connector (2) is provided with a wrong plugging prevention key (5*b*).

9 Claims, 7 Drawing Sheets

PLUG-IN OPTICAL CONNECTOR WITH WRONG PLUGGING PREVENTION KEY

BACKGROUND OF THE INVENTION

1. Field of the Invention

The present invention relates to optical connectors and, particularly, to an optical connector with a wrong plugging prevention key.

2. Related Art

Plug-in optical connectors according to Japanese Industrial Standards (JIS) C-5983-F14 are well known. The plug-in optical connectors are an optical connector attached to a board and able to plug in and out of another optical connector attached to another board by moving along rails, for example.

FIG. 7 shows a conventional plug-in optical connector which consists of a male (plug-in) optical connector 1' and a female (plug-in) optical connector 2'. Each of the optical connectors 1' and 2' is provided with eight connection plug mounting sections 11' or 21', each of which receives a connection plug 9 or 9'. Each connection plug 9 or 9' is fixed to an end of an optical cable 91 or 91' such that an optical fiber (not shown) is fixed to a ferrule 93 or 93'.

When the male optical connector 1' is plugged in the female optical connector 2', the connection plugs 9 are optically connected to the corresponding connection plugs 9' of the mating optical connector 2'. That is, the ferrules 93 and 93' of the connection plugs 9 and 9' in the male and female optical connector 1' and 2', respectively, are opposed and aligned within a sleeve holder 92. Thus, a plurality of connection plugs can be optically connected by mating a pair of male and female optical connectors. The male optical connector 1' is provided with the sleeve holders 92 and is slightly different from the female optical connector 2'.

Where a plurality of pairs of optical connectors such as shown in FIG. 7 are plugged in, a wrong plugging prevention key can be provided to prevent wrong plugging of a pair of optical connectors which should not be pair. However, there is no plug-in optical connector equipped with such a wrong plugging prevention key.

SUMMARY OF THE INVENTION

Accordingly, it is an object of the invention to provide an optical connector equipped with a wrong plugging prevention key.

According to one aspect of the invention there is provided a plug-in optical connector comprising a pair of first and second optical connectors to be fixed to a pair of first and second boards, respectively; first means provided on a plugging side of said first optical connector for receiving a first wrong plugging prevention key; and second means provided on a plugging side of said second optical connector for receiving a second wrong plugging prevention key which corresponds to said first wrong plugging prevention key.

According to another aspect of the invention there is provided a plug-in optical connector comprising a pair of first and second optical connectors to be fixed to a pair of first and second boards, respectively; a first wrong plugging prevention key provided on a plugging side of said first optical connector; and a second wrong plugging prevention key provided on a plugging side of said second optical connector.

According to an embodiment of the invention, said second optical connector comprising an outer housing; a rear housing attached to said outer housing; and an inner housing movable inside said outer and rear housings.

According to another embodiment of the invention, the second optical connector further comprises engaging sections provided on said inner and outer housings, respectively, to join said inner and outer housings by engagement; and a second lock provided on said inner housing for locking said inner housing with said first optical connector when said first and second optical connector are plugged in.

According to still another embodiment of the invention, the second optical connector further comprises a release section provided on said first optical connector for releasing said engagement by said engaging section; and a first lock provided on said first optical connector for locking said first optical connector with said inner housing when said first and second optical connector are plugged in.

According to still another aspect of the invention there is provided a plug-in optical connector to be fixed to a first board and plugged in a mating optical connector to be fixed to a second board and having a plugging side thereof a second attaching section to which a second wrong plugging prevention key is to be attached, comprising a first attaching section provided on a plugging side of said plug-in optical connector for receiving a first wrong plugging prevention key which corresponds to said second wrong plugging prevention key.

According to yet another aspect of the invention there is provided a plug-in optical connector to be fixed to a first board and plugged in a mating optical connector to be fixed to a second board and having a second wrong plugging prevention key on a plugging side thereof, comprising a first wrong plugging prevention key provided on a plugging side of said plug-in optical connector and corresponding to said second wrong plugging prevention key.

According to another embodiment of the invention, the plug-in optical connector further comprises an outer housing; a rear housing attached to said outer housing; and an inner housing movable inside said outer and rear housings.

According to still another embodiment of the invention, the plug-in optical connector further comprises engaging sections provided on said inner and outer housings, respectively, for fixing said inner housing to said outer housing by engagement; and a lock provided on said inner housing for locking said inner housing to said mating optical connector when said plug-in optical connector is plugged in said mating optical connector.

According to another aspect of the invention there is provided a plug-in optical connector to be fixed to a first board and plugged in a mating optical connector to be fixed to a second bard and having a second wrong plugging prevention key on a plugging side thereof, said mating optical connector comprising an outer housing, a rear housing attached to said outer housing; an inner housing movable inside said outer and rear housings; engaging sections provided on said inner and outer housings, respectively, for fixing said inner housing to said outer housing by engagement; a second lock provided on said inner housing for locking said inner housing with said plug-in optical connector when said plug-in optical connector and said mating optical connector are plugged in, and said plug-in optical connector comprising a first wrong plugging prevention key provided on a plugging side thereof and corresponding to said second wrong plugging prevention key; a release section for releasing said engagement by said engaging section; and a first lock for said inner housing with said plug-in optical connector when said plug-in optical connector and said mating optical connector are plugged in.

According to another embodiment of the invention, the wrong plugging prevention key is provided on the outer housing.

According to still another embodiment of the invention, the wrong plugging prevention key is provided on the inner housing.

DESCRIPTION OF THE PREFERRED EMBODIMENTS

Figure 1:
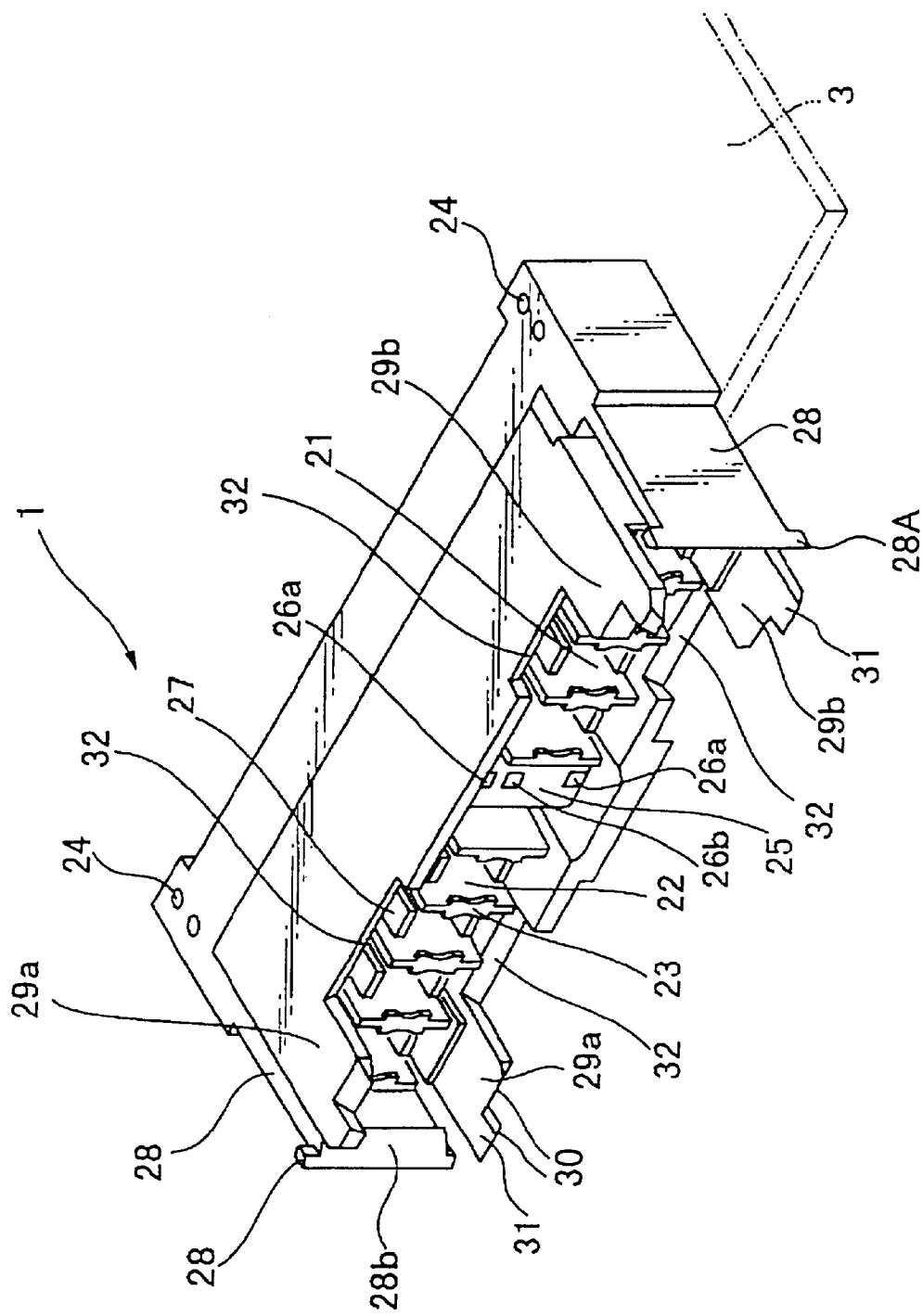
FIG. 1 is a perspective view of a male optical connector of a plug-in optical connector according to an embodiment of the invention.
Figure 2:
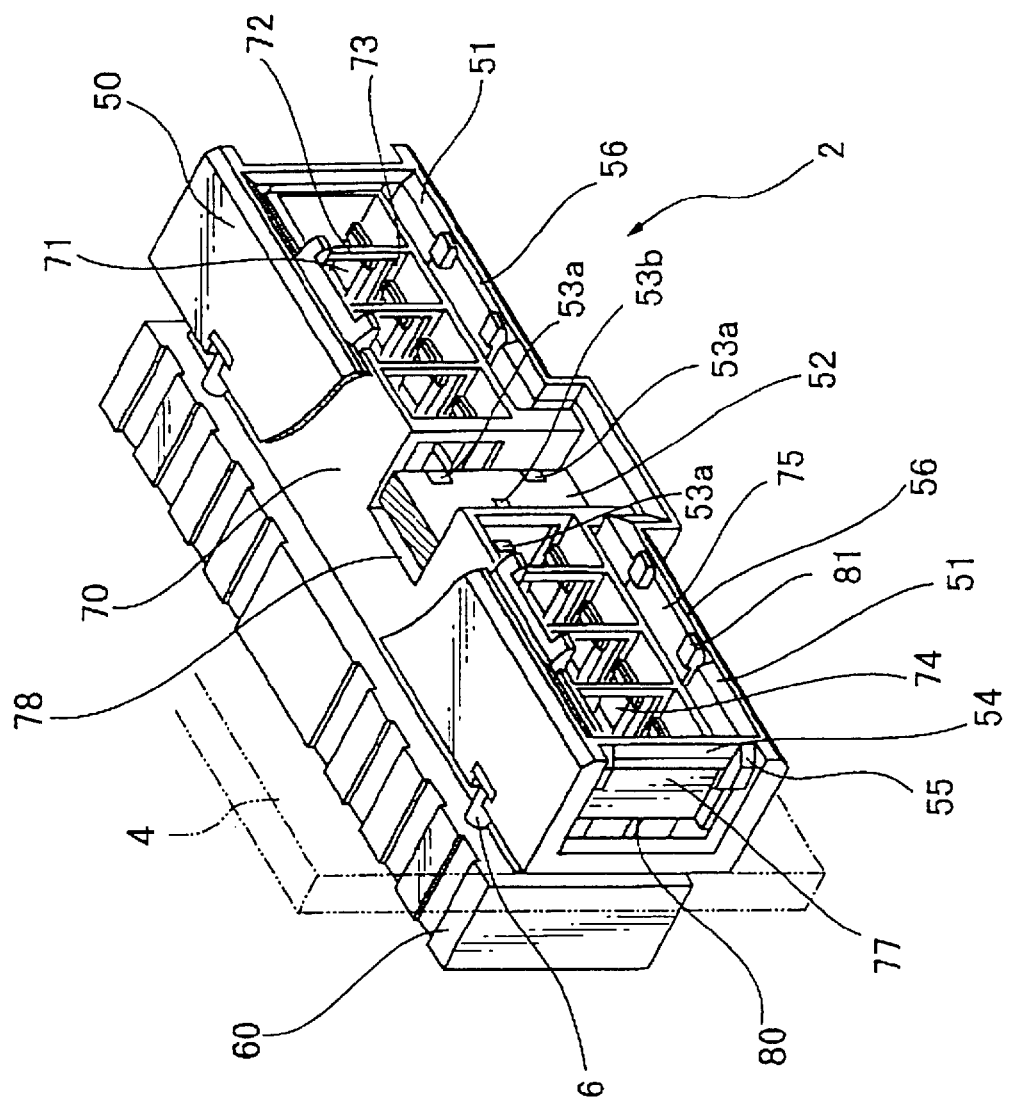
FIG. 2 is a partially cutaway, perspective view of a female optical connector of the plug-in optical connector according to an embodiment of the invention.

In the following embodiments, plug-in optical connectors are described as examples, but the invention is applicable to any type of optical connector. FIG. 1 shows a male optical connector 1 fixed to a board 3 and FIG. 2 shows a female optical connector 2 fixed to a board 4. These (plug-in) optical connectors 1 and 2 are in one-toone correspondence to each other and plugged in and out of one another.

Figure 3:
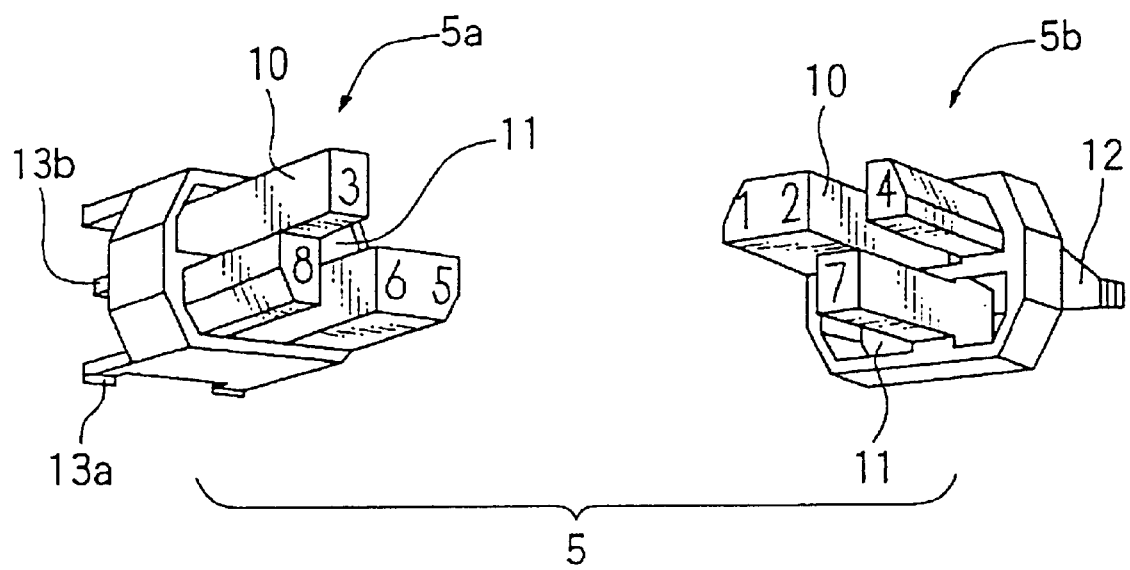
FIG. 3 is a perspective view of wrong plugging prevention keys for the optical connector.

The boards 3 and 4, to which the male and female optical connectors 1 and 2 are fixed, respectively, are movable along rails or grooves (not shown). The male and female optical connectors 1 and 2 are plugged in or out of each other by moving one of the boards 3 and 4 with respect to the other along the rails.

Where a plurality of pairs of optical connectors 1 and 2 are used, care must be taken not to plug a pair of optical connectors in another type of optical connectors by accident. That is, it is necessary to ensure plugging of the same type of optical connectors or an optical connector and an electrical connector. Wrong plugging can cause a system fault. In order to prevent such wrong plugging, according to the invention, a pair of wrong plugging prevention keys 5a and 5b are provided for the plug-in optical connector as shown in FIG. 3. FIGS. 1 and 2 show the optical connectors 1 and 2 without such prevention key.

The structure and operation of the wrong plugging prevention keys 5a and 5b will be described with reference to FIG. 3. The prevention keys 5a and 5b each have a plurality of protruded members 10 each having one or combination of the numbers from one to eight. A through-hole 11 is provided at an area where no protruded member is provided. The numbers (3, 5, 6, 8) assigned to a prevention key 5a are different from the numbers (1, 2, 4, 7) assigned to the other prevention key 5b. The prevention keys 5a and 5b are complement in form to each other. Consequently, the protruded member 10 goes through the through-hole 11 of a mating key while the through-hole 11 allows pass of the protruded member 10 of the mating key. If a prevention key with the protruded member 10 having the same number is used by error, the protruded members 10 abut against each other, preventing them from coming closer beyond a predetermined distance. Thus, wrong plugging is prevented. It is appreciated that the prevention keys may take other shapes.

Figure 7:
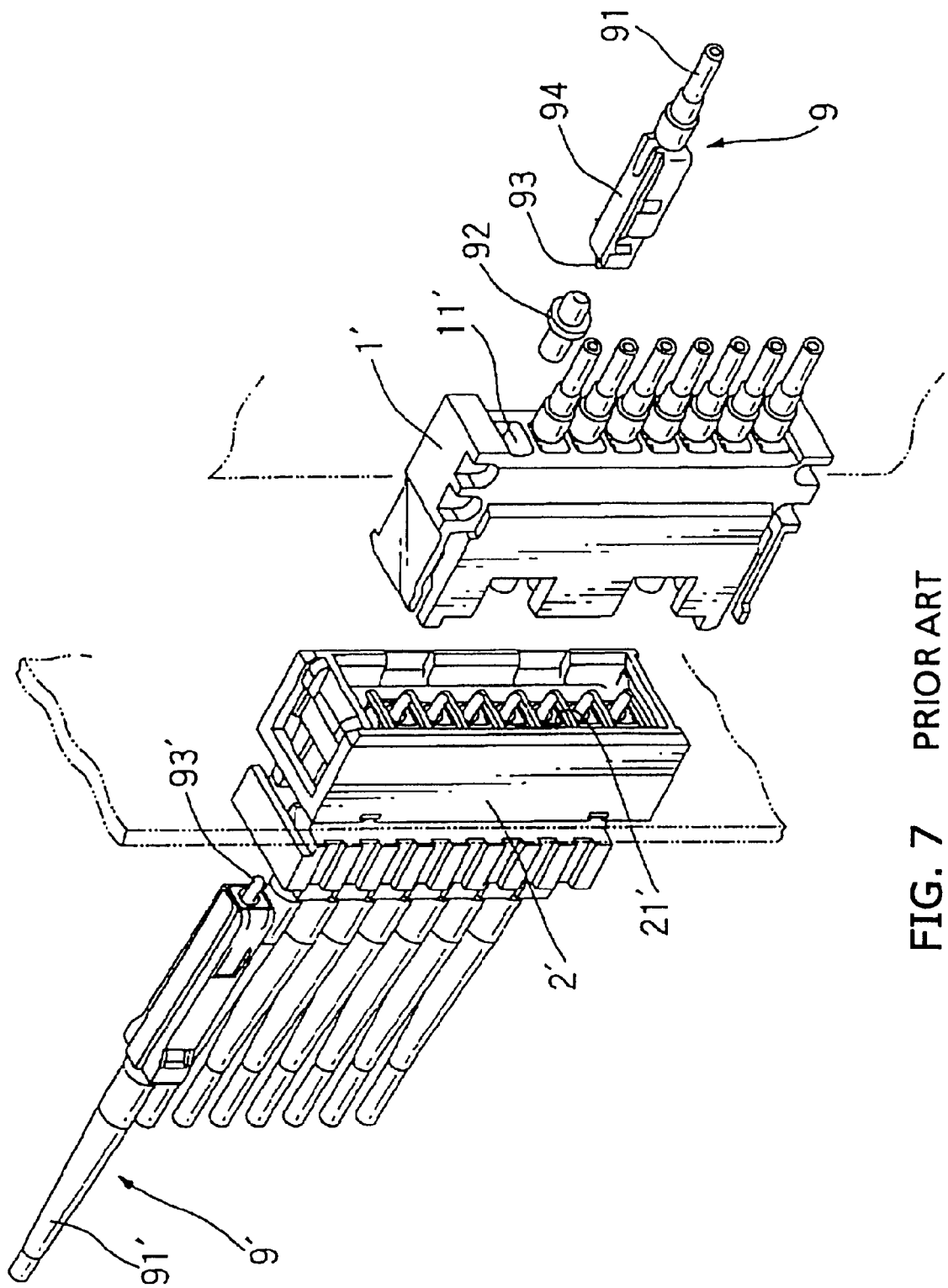
FIG. 7 is a perspective view of a conventional plug-in optical connector.

Referring back to FIGS. 1 and 2, a plurality of connection plugs are provided in each of the male and female optical connectors 1 and 2 in a similar manner to the FIG. 7 conventional plug-in optical connector. When the male and female connectors 1 and 2 are plugged in, the connection plugs are optically connected in one-to-one correspondence. Each of the optical connectors 1 and 2 is provided with eight connection plug mounting sections 21 (FIG. 1) or 71 (FIG. 2). Eight connection plugs are put into the mounting sections 21 or 71 from the back. The mounting sections 21 of the male optical connector 1 are separated from each other by walls 22 extending from the back to the front while those of the female optical connector 2 are separated only on the front face by partitions 72 and guide grooves 73 are provided behind the partitions 72. Consequently, the connection plugs 22 are inserted along the walls in the male optical connector 1 and along the guide grooves 73 in the female optical connector 2. They are fixed in the mounting sections of the male optical connector 1 such that the outer knobs (corresponding to the element 94 in FIG. 7) are not attached but, in those of the female optical connector 2, such knobs are attached for making them detachable.

A pair of levers 27 (FIG. 1) or 74 (FIG. 2) are provided in each of the mounting sections for fixing the connection plug at a predetermined position. Each lever 27 or 74 is movable outwardly and a pair of the levers 27 or 74 holds a connection plug between them. A pair of sleeve holder engaging pieces 23 are provided at opposite sides of each mounting section 21 for positioning the sleeve holder (corresponding to the element 92 of FIG. 7).

Unlike the female optical connector 2, the male optical connector 1 is molded as a unit. Two positioning holes 24 are provided at either side of the male optical connector 1 to fix the male optical connector 1 to the board 3 at a predetermined position such that the front section of the male optical connector 1 projects from the front edge of the board 3 for plugging in the female optical connector 2.

The male optical connector 1 is provided at the center of the front face with an attaching section 25 to which the prevention key 5 (FIG. 3) is attached. The prevention key 5 may be attached to another place. Four mounting sections 21 are provided at either side of the attaching section 25. Two holes 26a are provided in the attaching section 25 to receive the protruded members 12 of the prevention key 5b for fixing the prevention key 5b to the male optical connector 1 while a hole 26b receives the remaining protruded member or key orientation protruded member to fix the prevention key 5b to the male optical connector 1 in the right direction. The orientation protruded member is provided at a position close to one of the protruded members 12 so that by checking the positions of this protruded member and the hole in the male optical connector it is possible to prevent wrong fixture of the prevention key to the male optical connector.

A pair of lock arms 28 are provided at opposite ends of the male optical connector 1 for lock with an inside housing 70 of the female optical connector 2.

Each lock arm 28 has a T-shaped form and a front lock edge 28b with a pair of stoppers 28a at opposite ends. This lock edge 28b is tapered toward the front and is movable in the lateral direction by flexing lock arm 28. As described hereinafter, the stoppers 28a prevents excessive inward movement of the lock arm 28 and facilitates lock with and release from the inside housing 70 of the female optical connector 2.

Two pairs of tongues 29a and 29b are provided on opposite sides of the attaching section 25 between the lock arms 28. Each pair of tongues 29a or 29b is symmetrically arranged with the other pair of tongues 29b or 29a, and the corresponding tongues of each pair are identical in form. These tongues 29a and 29b facilitate insertion of the male optical connector 1 into the female optical connector 2. The distance between the tongues 29a or 29b is substantially equal to the distance between the stoppers 28a so that when the lock arm 28 is flexed, the stoppers 28a abut against the tongues 29a to prevent the lock arm 28 from flexing beyond a predetermined limit.

The front edge of each tongue 29a or 29b is tapered toward the front to form an inwardly sloping face 30 which corresponds to an outwardly sloping face 51 of an outside housing 50 as described hereinafter. These sloping faces 30 and 51 facilitate insertion of the male optical connector 1 into the female optical connector 2. A protruded portion 31 extends forwardly from the front edge of each tongue 29a or 29b for starting insertion of the male optical connector 1 into the female optical connector 2. With all these provisions, the male optical connector 1 is inserted into the female optical connector 2 without difficulty even if the position of the male optical connector 1 is offset from the regular insertion position with respect to the female optical connector 2.

Two pairs of engagement release section 32 are provided on either side of the attaching section 25 inside of the tongues 29. The engagement release sections 32 of each pair are opposed to each other and are identical with each other in terms of form. Each engagement release 32 is tapered forwardly to provide an outwardly sloping face. These outwardly sloping faces correspond to the inwardly sloping faces (engagement pieces 75) of the female optical connector 2. As described hereinafter, by moving the corresponding sections of the female optical connector with the engagement release sections 32 it is possible to release engagement between the inside and outside housings 70 and 50.

In FIG. 2, the female optical connector 2 comprises an outer housing 50, a rear housing 60 provided on the side of a board 4 opposite to the side on which the outer housing 50 is provided, and an inner housing 70 which is slidable between the outer and rear housings 50 and 60 through the board 4. The outer and rear housings 50 and 60 are joined together by screws 6 so as to hold the board between them. The diameters of apertures for the screws 6 in the board 4 are made slightly larger than those that are sufficiently large to allow passage of the screws so that the female connector 2 is held movable with respect to the board 4, thereby facilitating insertion of the male optical connector in the female optical connector 2. A plurality of holes or recesses are provided in the outer or rear housings 50 or 60 to receive the screws 6.

In addition to the screw holes, a relatively large opening (not shown) is provided in the board 4 to allow movement of the inner housing 70 within the outer and rear housings 50 and 60 so that the inner housing 70 is movable back and forth inside the outer and rear housings 50 and 60.

The rear housing 60 has a box-like form and an opening in the front face to receive the rear part of the inner housing 70. Upon assembling the female optical connector 2, it is attached to the rear part of the inner housing 70 so as to accommodate the rear part of the inner housing 70. An opening (not shown) is provided in the rear face of the rear housing 60 for guiding the eight connection plugs. The diameter of the opening is smaller than that of the front opening so that the inner housing 70 does not fall out of the opening.

The outer housing 50 is made in the form of a frame except that it has an attaching section 52 at the center of the front face to which the wrong insertion preventive key 5a is to be attached. Part of the wall of the outer housing 50 is removed to show that the to side of the attaching section 52 is joined with the broken wall. Openings are provided in the front face of the outer housing 50 on either side of the attaching section 52.

Five holes 53a and 53b are provided in the attaching section 52 for attaching the wrong insertion preventive key 5a. Four of these holes 53a receive the projections 13a of the wrong insertion preventive key 5a. By corresponding the projections to these holes, it is possible to detachably attach the key 5a to the outer housing 50. The remaining hole 53b receives the key direction determining projection 13b to prevent the key from being fixed to the outer housing 50 in a wrong direction.

Two pairs of outwardly sloping surfaces 51 are provided on either side of the attaching section 52 so as to correspond to the inwardly sloping surfaces 30 of the male optical connector 1. Upon plugging the male connector 1 in the female connector 2, these sloping surfaces 30 and 51 correspond to each other to facilitate insertion of the male optical connector 1 in the female optical connector 2.

A pair of stopper section 54 are provided at opposite sides of the outer housing 50 so that when the inner housing 70 is put in the outer housing 50, the stopper sections 54 of the outer housing 50 abut against the side plates 77 of the inner housing 70. Consequently, the inner housing 70 is prevented from falling through the front opening of the outer housing 50. Projections 55 are provided on opposite ends of each stopper section 54 so as to move outwardly the stopper section 28a of the lock arms 28 (FIG. 1) when the male optical connector 1 is plugged in the female optical connector 2. By moving the lock arms 28, it is made easier to lock or release the lock between the lock arms 28 and the inner housing 70.

An opening is provided in the rear face of the outer housing 50 to receive the front portion of the inner housing 70. When the female optical connector 2 has been assembled, the rear opening of the outer housing 50 communicates with the front opening of the rear housing 60 so that the entire inner housing 70 is put in the outer and rear housings 50 and 60. Upon assembling, the inner housing 70 is put into the outer housing 50 from back so that the front portion of the inner housing 70 is put in the outer housing 50.

Figure 4:
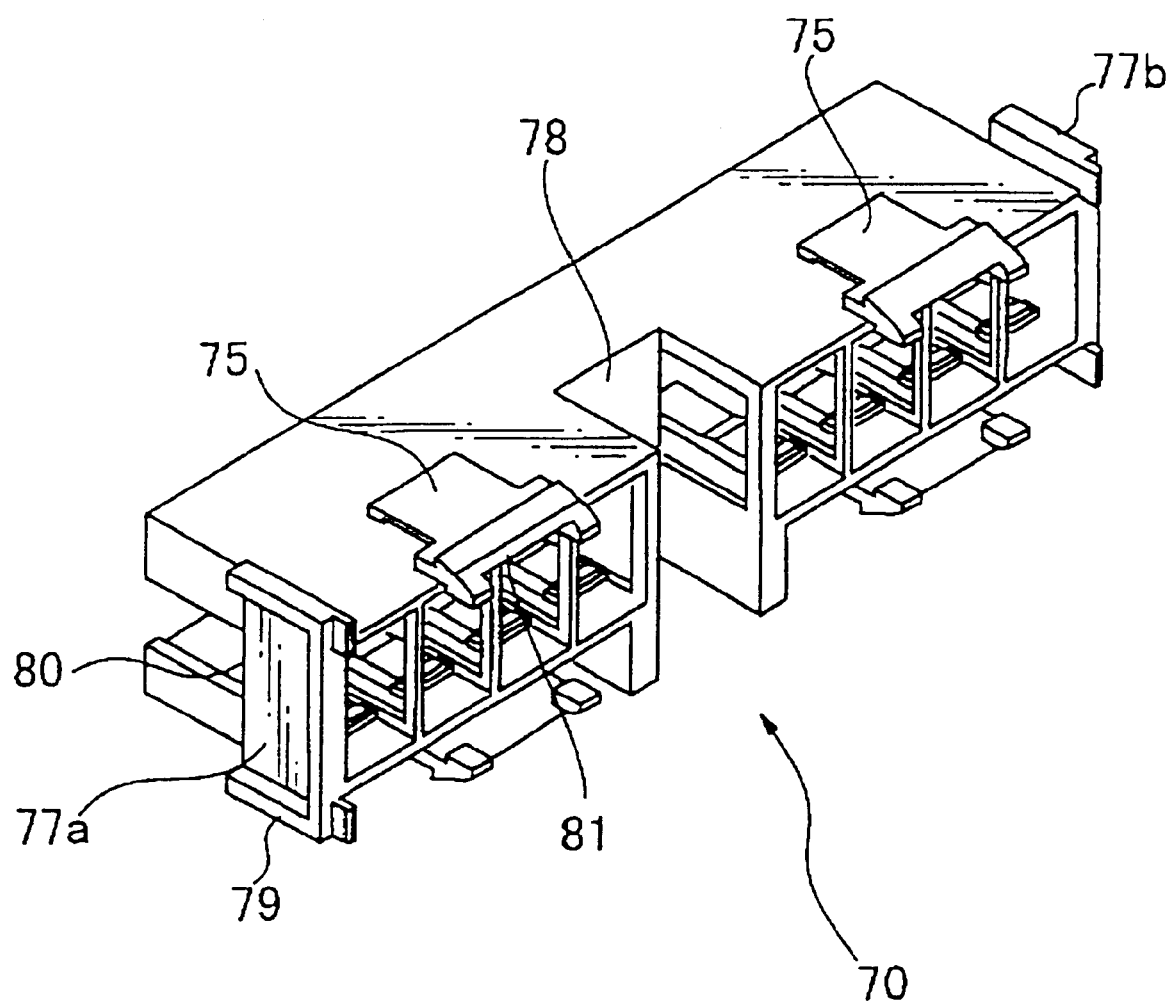
FIG. 4 is a perspective view of an inner housing for the female optical connector.

In FIG. 4, a recess 78 is provided at the center of the front face of the inner housing 70 corresponding to the recess (FIG. 2) for attaching section 52 in the outer housing 50. When the inner housing 70 is put in the outer housing 50, the recess 78 receives the attaching section 52 of the outer housing 50.

A pair of side plates 77a and 77b are provided on opposite sides of the inner housing 70. A pair of guiding sections 79 are provided on upper and lower edges of each side plate 77 to guide the inner housing 70 to a predetermined position in the outer housing 50. A pair of guiding grooves (not shown) are provided on the outer housing 50 corresponding to the guiding sections 79. The widths of side plates 77a and 77b are different and the widths of the guiding grooves are also different so that only when the widths of the side plates 77 and the guiding grooves are matched, the inner housing 70 can be inserted into the outer housing 50. Thus, the direction of the inner housing 70 with respect to the outer housing 50 is kept constant.

A lock recess 80 is provided in the side plate 77a or 77b to receive the lock projection 28b of the lock arm 28 when the male and female optical connectors 1 and 2 are plugged in. Thus, the male optical connector 1 is locked with the inner housing 70.

Two pairs of engaging pieces 75 are provided on either side of the central recess 78. Each engaging piece 75 is made in the form of a T-shape. An engaging edge 81 is provided on the front edge of an engaging piece 75. It has an inwardly sloping surface and is vertically movable by flexing of the engaging piece 75.

A pair of guiding grooves 56 are provided on the bottom wall of the outer housing 50 (FIG. 2) corresponding to the engaging pieces 75 and have projections (not shown) in a direction perpendicular to the insertion direction of the inner housing 70 corresponding to the engaging projections 81. When the inner housing 70 is put into the outer housing 50 along the guiding grooves 56 to a certain extent, the engaging sections 75 of the inner housing 70 are flexed inwardly to pass the projections. Consequently, the inner housing 70 is snapped in the outer housing 50 with a degree of play so that the inner housing 70 is positioned at the front portion of the outer housing 50. Consequently, a relatively large force is required to do such positioning. When the inner housing 70 is moved rearwardly from such a position, the action of the male optical connector 1 is required to release the engagement between the inner and outer housings 70 and 50. As described hereinafter, the release is made only when the male and female optical connectors 1 and 2 are moved to a close position to each other.

How the male and female optical connectors are plugged in will be described bellow. When the male optical connector 1 is moved toward the female optical connector 2, the projections 31 of the respective tongues 29 are brought into contact with the outer housing 50 of the female optical connector 2 while the wrong insertion preventive keys 5a and 5b of the male and female optical connectors 1 and 2 are opposed to each other (FIG. 3).

If the wrong insertion preventive keys are not compatible with each other, at least one of the projections 10 abuts against another projection to prevent the male and female optical connectors 1 and 2 from moving closer and being plugged in to each other.

When the wrong insertion preventive keys 5a and 5b correspond to each other, the male optical connector 1 is moved to the female optical connector 2 without any block by the wrong insertion preventive keys 5a and 5b. Since part of the outside wall of the female optical connector 2 is received in the space 39 between the wrong insertion preventive projection 38 and the body 37, the wrong insertion preventive projections 38 do not prevent the male optical connector 1 from moving toward the female optical connector 2. Consequently, the stopper 28a of the male optical connector 1 are brought into contact with the projections 55 of the female optical connector 2. As the male optical connector 1 is moved further to the female optical connector 2, the lock arms 28 pass the projections 55 so that the lock projection 28b of the lock arms 28 are snapped in the lock recess 80 of the inner housing 70. Consequently, the engagement is locked by the lock arms 28. Simultaneously, the tongues 29 of the male optical connector 1 enter a space between the inner and outer housings 70 and 50 and then in the outer housing 50 when the lock is completed. Under such lock conditions, the tongues 29 are not visible while the lock arms 28 are exposed from the female optical connector 2.

In the lock operation, the connection plugs mounting sections 21 and 71 of the male optical connector 1 and the inner housing 70, respectively, are brought close to each other so that the connection plugs are optically connected to each other in one-to-one correspondence.

Prior to and immediately after the lock, the engaging projections 81 of the inner housing 70 are engaged with projections (not shown) in the guiding grooves 56 to the outer housing 50 so that the inner housing 70 is only slightly movable in the front portion of the outer housing 50.

When the male optical connector 1 is further pushed into the female optical connector 2 after the lock, the connection plugs are completely plugged in at the regular plugging position. According to the invention, the male optical connector 1 can be pushed into the female optical connector 2 beyond the regular plugging position to a certain extent.

When the male optical connector 1 is further pushed into the female optical connector 2, the engagement release section 32 of the male optical connector 1 enters a space between the outer housing 50 and the inwardly sloping surfaces of the engaging section 75, moving the engaging section 75 inwardly, thereby releasing the engagement and completing the plugging of the connection plugs at the regular plugging position. Consequently, the inner housing 70 is movable rearwardly in the outer housing 50 and the rear housing 60. Thus, the male optical connector 1 can be inserted into the female optical connector 2 beyond the regular plugging position by that much. After the engagement between the inner and outer housings 70 and 50 is released, the inner housing 70 is movable inside the outer and rear housings 50 and 60.

However, the lock between the inner housing 70 and the male optical connector 1 is maintained. More specifically, the lock between the projections 28b of the lack arms 28 and the recesses 80 of the side plates 77 is not released. Consequently, the respective connection plugs of the male optical connector 1 and the inner housing 70 remain optically connected. This connection is maintained unless the male and female optical connectors 1 and 2 are separated beyond a certain distance.

Another embodiment of the female optical connector 2A will be described with reference to FIGS. 5 and 6. The wrong insertion preventive key 5 is provided on the inner housing 70A in this embodiment instead of the outer housing of the embodiment of FIGS. 2 and 5.

An attaching section 52A is provided only on the inner housing 70A. A recess is provided only in the inner housing 70A. Consequently, substantially all of the front face of the outer housing 50A is opened, forming substantially the complete frame shape.

Figure 5:
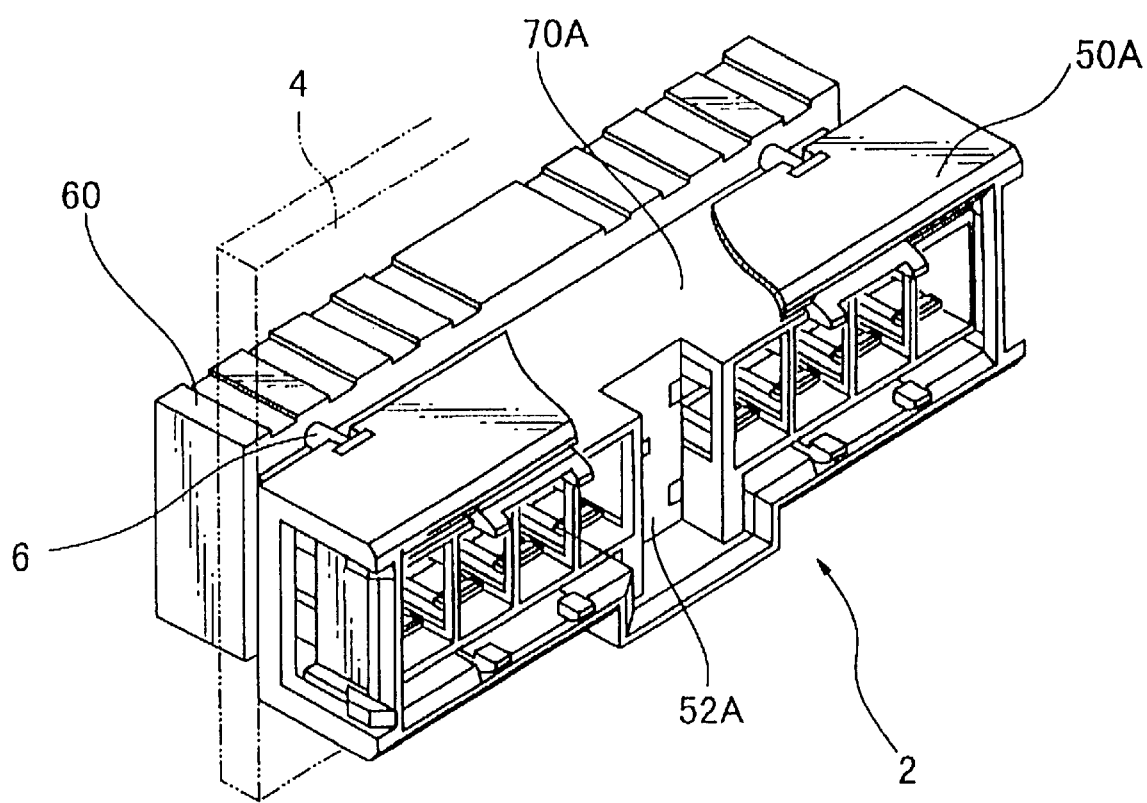
FIG. 5 is a partially cutaway, perspective view of a female optical connector according to another embodiment of the invention.
Figure 6:
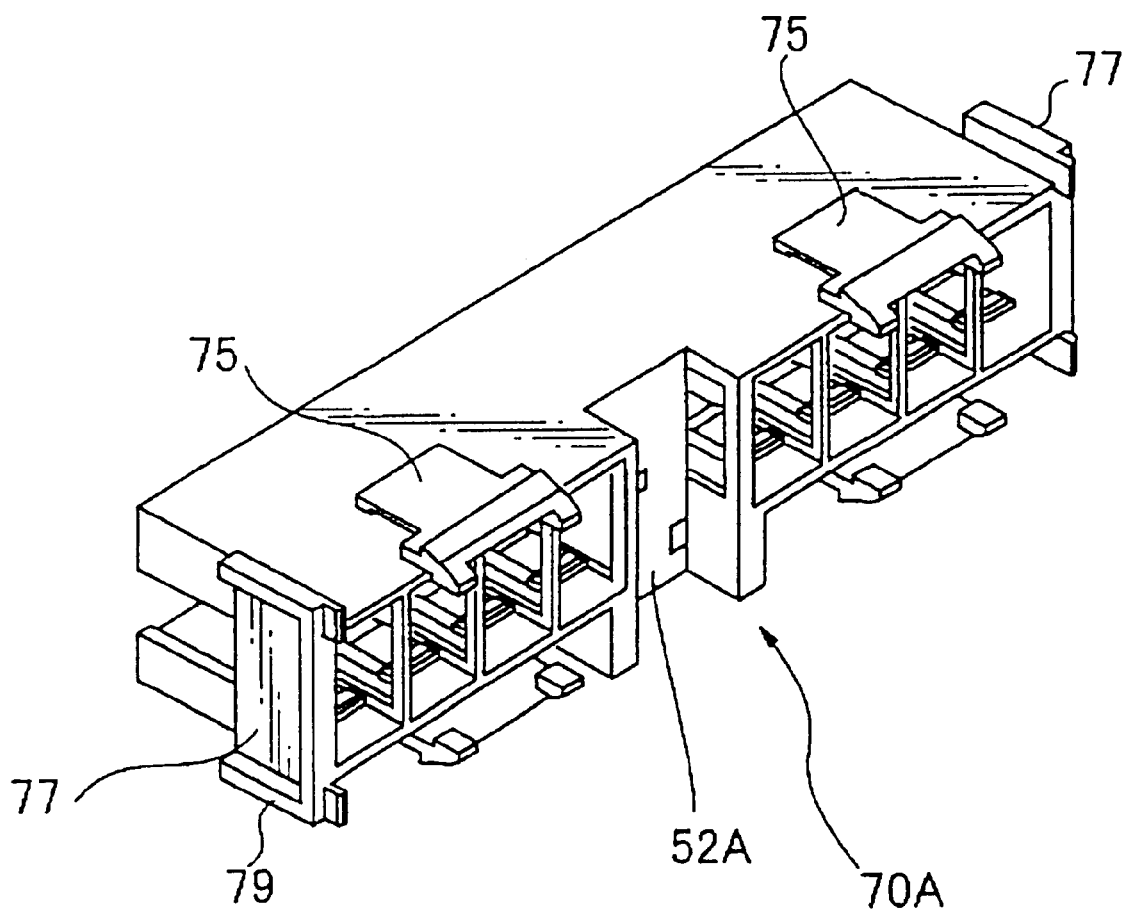
FIG. 6 is a perspective view of an inner housing for the female optical connector of FIG. 5.

The female optical connector 2A can be used with the male optical connector 1 in the same way as the female optical connector 2 of FIGS. 2 and 5.

According to the invention there is provided a plug-in optical connector equipped with a wrong plugging prevention key.

What is claimed is:

1. A plug-in optical connector to be fixed to a first board and plugged in a mating optical connector to be fixed to a second bard and having a second wrong plugging prevention key on a plugging side thereof, said mating optical connector comprising:

an outer housing, a rear housing attached to said outer housing;

an inner housing movable inside said outer and rear housings;

engaging sections provided on said inner and outer housings, respectively, for fixing said inner housing to said outer housing by engagement;

a second lock provided on said inner housing for locking said inner housing with said plug-in optical connector when said plug-in optical connector and said mating optical connector are plugged in, and said plug-in optical connector comprising:

a first wrong plugging prevention key provided on a plugging side thereof and corresponding to said second wrong plugging prevention key;

a release section for releasing said engagement by said engaging section; and a first lock for said inner housing with said plug-in optical connector when said plug-in optical connector and said mating optical connector are plugged in.

2. A plug-in optical connector comprising:

a pair of first and second optical connectors to be fixed to a pair of first and second boards, respectively, said second optical connector having:

an outer housing;

a rear housing attached to said outer housing; and an inner housing movable inside said outer and rear housings;

first means provided on a plugging side of said first optical connector for receiving a first wrong plugging prevention key;

second means provided on a plugging side of said second optical connector for receiving a second wrong lugging prevention key which corresponds to said first wrong plugging prevention key;

engaging sections provided on said inner and outer housings, respectively, to join said inner and outer housings by engagement; and second lock provided on said inner housing for locking said inner housing with said first optical connector when said first and second optical connectors are plugged in.

3. A plug-in optical connector according to claim 2, which further comprises:

a release section provided on said first optical connector for releasing said engagement by said engaging section; and a first lock provided on said first optical connector for locking said first optical connector with said inner housing when said first and second optical connectors are plugged in.

4. A plug-in optical connector comprising:

a pair of first and second optical connectors to be fixed to a pair of first and second boards, respectively, said second optical connector having:

an outer housing;

a rear housing attached to said outer housing; and an inner housing movable inside said outer and rear housings;

a first wrong plugging prevention key provided on a plugging side of said first optical connector;

a second wrong plugging prevention key provided on a plugging side of said second optical connector;

engaging sections provided on said inner and outer housings, respectively, to join said inner and outer housings by engagement; and second lock provided on said inner housing for locking said inner housing with said first optical connector when said first and second optical connectors are plugged in.

5. A plug-in optical connector according to claim 4, which further comprises:

a release section provided on said first optical connector for releasing said engagement by said engaging section; and a first lock provided on said first optical connector for locking said first optical connector with said inner housing when said first and second optical connectors are plugged in.

6. A plug-in optical connector according to one of claims 1 and 2–5, wherein said wrong plugging prevention key is provided on said outer housing.

7. A plug-in optical connector according to one of claims 1 and 2–5, wherein said wrong plugging prevention key is provided on said inner housing.

8. A plug-in optical connector to be fixed to a first board and plugged in a mating optical connector to be fixed to a second board and having a plugging side thereof a second attaching section to which a second wrong plugging prevention key is to be attached, comprising:

a first attaching section provided on a plugging side of said pug-in optical connector for receiving a first wrong plugging prevention key which corresponds to said second wrong plugging prevention key;

an outer housing;

a rear housing attached to said outer housing;

an inner housing movable inside said outer and rear housings;

engaging sections provided on said inner and outer housings, respectively, for fixing said inner housing to said outer housing by engagement; and a lock provided on said inner housing for locking said inner housing to said mating optical when said plug-in optical connectors is plugged in said mating optical connector.

9. A plug-in optical connector to be fixed to a first board and plugged in a mating optical connector to be fixed to a second board and having a second wrong plugging prevention key on a plugging side thereof, comprising:

a first wrong plugging prevention key provided on a plugging side of said plug-in optical connector and corresponding to said second wrong plugging prevention key;

an outer housing;

a rear housing attached to said outer housing;

an inner housing movable inside said outer and rear housings;

engaging sections provided on said inner and outer housings, respectively, for fixing said inner housing to said outer housing by engagement; and a lock provided on said inner housing for locking said inner housing to said mating optical when said plug-in optical connectors is plugged in said mating optical connector.

* * * * *